(12) United States Patent
Ranta (10) Patent No.: US 7,035,676 B2
(45) Date of Patent: Apr. 25, 2006

(54) POWER SAVING IN MOBILE STATIONS (75) Inventor: Jukka Ranta, Turku (FI)

(73) Assignee: Nokia Mobile Phones, Ltd., Espoo (FI)

( * ) Notice: Subject to any disclaimer, the term of this patent is extended or adjusted under 35 U.S.C. 154(b) by 673 days.

(21) Appl. No.: 09/814,989

(22) Filed: Mar. 22, 2001

(65) Prior Publication Data

US 2001/0034254 A1    Oct. 25, 2001

(30) Foreign Application Priority Data

Mar. 24, 2000    (FI) .................................. 20000700

(51) Int. Cl.
    *H04M 1/00*    (2006.01)
(52) U.S. Cl. .................... 455/574; 455/437; 455/550.1
(58) Field of Classification Search ............... 455/574, 455/343.1, 343.2, 343.5, 132; 370/320, 342, 370/441, 335
See application file for complete search history.

(56) References Cited

U.S. PATENT DOCUMENTS 5,613,235 A    3/1997    Kivari et al. ............... 455/343

(Continued)

FOREIGN PATENT DOCUMENTS

| EP | 0812119 A2 | 12/1997 |
|----|------------|---------|
| EP | 0833537 A2 | 4/1998 |
| GB | 2305825 | 4/1997 |
| WO | WO99/62285 | 12/1999 |

OTHER PUBLICATIONS

Technical Specification 3G TS 25.201, V3.1.0.

(Continued)

*Primary Examiner*—Lester G. Kincaid
*Assistant Examiner*—Sam Bhattacharya
(74) *Attorney, Agent, or Firm*—Perman & Green, LLP (57) ABSTRACT

A method of operating a mobile station in a WCDMA system. The mobile station has a rake receiver (90) having a plurality of demodulator fingers (71,72,73). One of the demodulator fingers monitors a neighbouring cell and other demodulator fingers monitor an assigned cell. When the mobile station is in an idle mode, if it is stationary, activity of the demodulator is reduced by switching off the demodulator finger which monitors the neighbouring cell.

22 Claims, 9 Drawing Sheets

U.S. PATENT DOCUMENTS

| | | | |
|---|---|---|---|
| 5,799,256 A | 8/1998 | Pombo et al. | 455/574 |
| 5,918,170 A | 6/1999 | Oksanen et al. | 455/343 |
| 6,269,075 B1 * | 7/2001 | Tran | 370/206 |
| 6,289,228 B1 * | 9/2001 | Rotstein et al. | 455/574 |
| 6,343,094 B1 * | 1/2002 | Yamamoto | 375/152 |
| 6,370,133 B1 * | 4/2002 | Kang et al. | 370/342 |
| 6,385,460 B1 * | 5/2002 | Wan | 455/515 |
| 6,532,222 B1 * | 3/2003 | Rege et al. | 370/335 |
| 6,539,006 B1 * | 3/2003 | Taylor | 370/335 |

OTHER PUBLICATIONS

Technical Specification 3GPP TS 25.102, V3.4.0.
Technical Specification 3GPP TS 25.101, V3.4.0.
Technical Specification 3G TS 25.213, V3.3.0.
Technical Specification 3GPP TS 25.223, V3.4.0.
Technical Specification 3GPP TS 25.304, V3.4.0.
Technical Specification 3GPP TS 25.305, V3.3.0.
European Search Report; EP 01 10 1593 dated Oct. 7, 2003.

* cited by examiner

POWER SAVING IN MOBILE STATIONS

FIELD OF THE INVENTION

This invention relates to mobile stations such as radiotelephones and in particular to mobile transceivers or user equipment capable of operating in a cellular radio network. The invention also relates to a power saving method to prolong battery life.

BACKGROUND OF THE INVENTION

Figure 1:
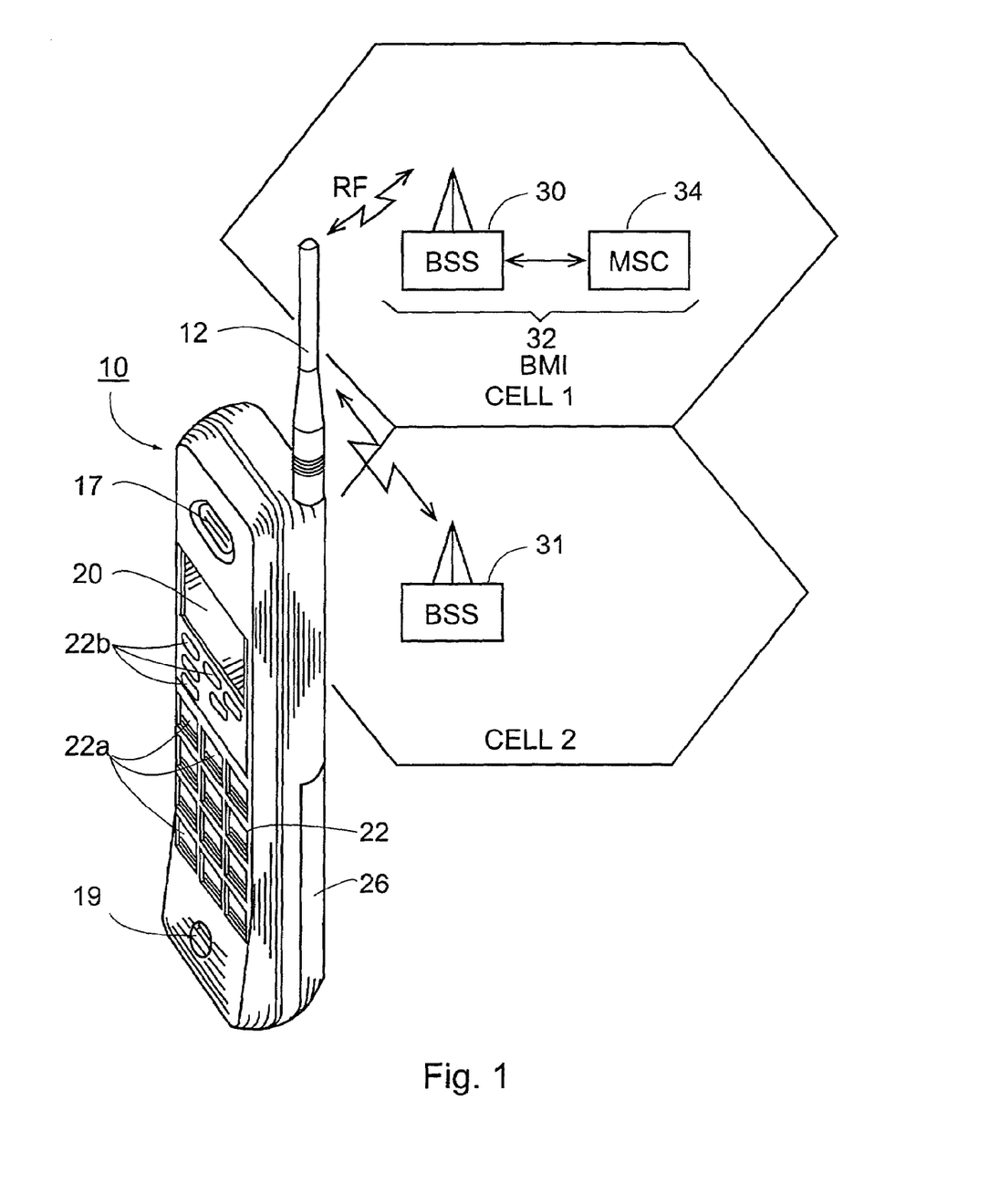
FIG. 1 shows a TDMA radio network including a mobile station.

FIG. 1 illustrates a cellular radio system comprising a number of base station sub-systems (BSSs) 30 and 31. Each base station sub-system comprises a base station (BS) and a base station controller (BSC). The base stations offer a two way radio interface to a mobile station 10 as defined by specifications of the cellular radio system. Such a radio interface comprises a plurality of defined channels, the exact arrangement and usage of which is specific to each cellular radio system. An example of one prior art system is the Global System for Mobile telecommunications (GSM) system. The radio interface offered to mobile stations in cells such as cell 1 and cell 2 consists of a number of common channels and a number of dedicated channels. A cellular radio system is often referred to as a "network" although the overall network comprises the Public Land Mobile Network (PLMN) section and a gateway connection to different public networks such as Public Switched Telecommunication Networks (PSTNS) referred to as "fixed networks".

The mobile station 10 requesting service from the network when initiating a call initiates a signalling message on an uplink radio interface channel called RACH (Random Access Channel) via a common uplink channel. The initiated access request is received at a base station from where it is forwarded to the respective BSC. From the BSS 30, 31 the access request is forwarded further to a Mobile Switching Center (MSC) 34 that is in charge of the procedures concerning call control. The MSC 34 acknowledges the access request to the mobile station via the BBS and a dedicated connection from the mobile station to the MSC can be established by assigning necessary connection resources as required between the mobile station 10 and the MSC 34. If the call is directed to another network such as a PSTN, connection is made from an external network connection support mechanism of the MSC referred to as a gateway MSC. The gateway MSC is usually integrated into the MSC 34. A call connection may then be made to national or international networks depending on the number which has been dialled.

After the mobile station 10 has been switched on, it takes a short time period until it is fully operational. The mobile terminal 10 first acquires synchronisation in a certain cell and then starts to listen to general information which is broadcast in the network in a downlink direction. A suitable cell is selected on the basis of received signal strength and additional criteria. After having selected a cell the mobile station 10 initiates a location update to the selected cell. Finally the mobile station 10 settles down in the selected cell waiting for a paging message.

Mobile stations in the form of radiotelephones, are typically battery powered in order to be portable. Therefore, power consumption is an important issue. It is desirable to provide long mobile station usage times with infrequent battery recharging intervals. A mobile station has at least two basic functional states when it is switched on: an idle mode and an active dedicated mode. When the mobile station is on, but no call is activated, answered or no data connection is established, the mobile station is in its idle mode. Thus it is able, for example, to be paged for terminating calls and terminating short messages and the user may initiate a call or other service requests. The dedicated mode of the mobile station occurs when a dedicated connection or logical link of packet radio link is seized or initiated to be reserved. The state change from idle mode to dedicated mode can be identified by the mobile station requesting resource allocation of dedicated resources of air interface connections. The mobile station will change from the dedicated mode to the idle mode when connection release has taken place. GSM systems operate according to time division multiple access (TDMA). In such a system, co-located cells use different pilot frequencies and a receiver is tuned to listen. In the idle mode a mobile station measures each frequency of neighbouring cells in order to be using the most suitable available cell. In the TDMA dedicated mode the mobile station may request and be granted a certain set of transmission circuits which may be a particular time slot or a set of time slots. The bandwidth carried by the pilot frequency of TDMA is divided in time into eight timeslots.

EP 812 119 concerns a GSM system and discloses a method for operating a cellular telephone in standby mode. The method involves the cellular telephone measuring the currently assigned channel and at least one other currently non-assigned channel. The cellular telephone detects changes in the received signal strength indicator (RSSI), in bit error rate (BER) or in similar parameter measurements, to determine whether or not it is stationary. Once the cellular telephone has determined from the error measurements that it has become stationary, it prompts either the user or the base station to confirm that this is so. The cellular telephone then terminates the measurements of at least one of the currently non-assigned channels to conserve energy, but continues monitoring the error rate to determine when it starts moving again. The method allows battery power of a cellular telephone to be saved by avoiding measurements for handoff when the cellular telephone is stationary.

The prior art also proposes mobile stations determining whether they are stationary by using an acceleration transducer to analyse motion in respect a random motion vector.

Another mobile telecommunications system is the universal mobile telecommunications system (UMTS). An UMTS system is similar in basic configuration to the system of FIG. 1 and comprises mobile stations (referred to as user equipment (UE)) connected to a mobile network.

In UMTS, the terrestrial radio network access section is referred to as UTRA. At present the access scheme in UTRA is a form of Code Division Multiple Access (CDMA) referred to as Direct-Sequence CDMA (DS-CDMA). The information which is being transmitted is spread over approximately a 5 MHz bandwidth, and so is often called Wideband CDMA (WCDMA).

UTRA has two functional modes, FDD (Frequency Division Duplex) and TDD (Time Division Duplex), for operating with paired and unpaired radio frequency bands respectively. The ability of a mobile station to operate in either FDD or TDD mode allows for efficient utilisation of the available spectrum according to the frequency allocation in different regions. At present UTRA is defined in technical specification TS 25.201 "Physical layer -General description" of the Third Generation Partnership Project (3GPP). The radio access network RAN definition of TDD is presented in technical specification TS 25.102. The FDD RAN is specified in technical specification TS 25.101.

FDD comprises a duplex method in which uplink and downlink transmissions use two different radio frequency bands. A pair of radio frequency bands, which have a specified separation, are assigned for the system. TDD comprises a duplex method in which uplink and downlink transmissions are carried over the same radio frequency by using synchronised time intervals. In TDD, time slots in a physical channel are divided into a transmission and a reception part. Information is transmitted reciprocally on uplink and downlink between the mobile station and the radio access network (RAN).

In a UTRA TDD system there is TDMA component in air interface multiple access in addition to DS-CDMA. Thus the multiple access has been also often denoted as TDMA/CDMA.

The arrangement of frames and timeslots in TDD will now be described. A 10 ms radio frame is divided into 15 slots (2560 chip/slot at a chip rate of 3.84 Mcps (Mega-chips per second)). A chip is a signal pulse cycle that is transferred by a transceiver to air interface and received by the receiver. In TDD mode a physical channel is defined as a code (or number of codes) and particular sequence of time slots.

The information rate of the channel varies with the symbol rate being derived from the 3.84 Mcps chip rate and the spreading factor. Thus the modulation symbol rates for FDD vary from 960 k symbols/s to 15 k symbols/s for uplink and from 960 k symbols to 7.5 k symbols/s for downlink. For TDD the modulation symbol rates vary from 3.84 M symbols/s to 240 k symbols/s.

Furthermore, Opportunity Driven Multiple Access (ODMA) in TDD mode can be used for relaying between nodes.

At present, channel coding and interleaving in UTRA has three optional alternatives, which are convolution coding, turbo-coding or no-channel coding. Upper layers of the network for the physical radio network indicate the channel coding selection.

In a WCDMA system, the radio network and cells have a hierarchical structure in which neighbouring cells in a cell layer use the same pilot frequency and in dedicated mode the radio link connections between the base station and the mobile station are uniquely identified by using codes to enable call identification.

Figure 4:
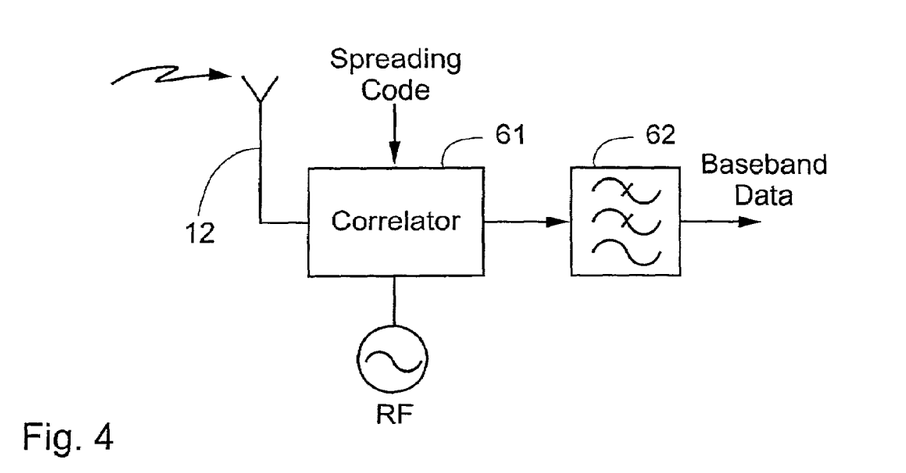
FIG. 4 shows a receiver arrangement for QPSK modulation.

A modulation arrangement will now be described with reference to FIG. 4. A receiver of a mobile station uses a correlator 61 in its RF section to despread a desired signal which then is passed through a baseband filter pass 62 in order to extract the desired signal. The desired signal is then passed on to a baseband section. Initial synchronisation of the receiver code to the RF carrier needs to be achieved before despreading may be processed.

Figure 5:
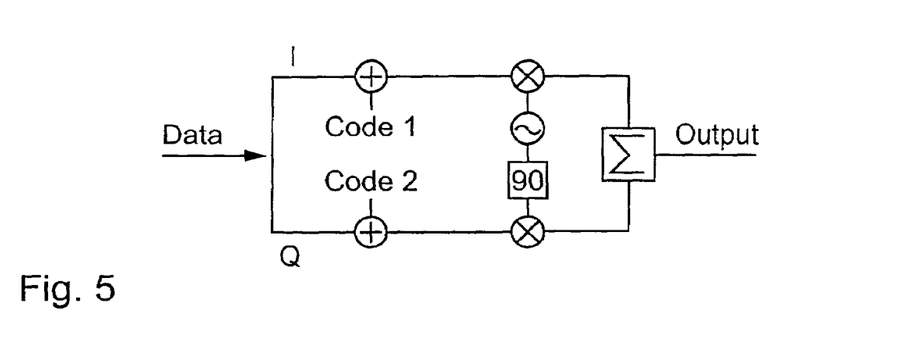
FIG. 5 shows a QPSK modulation scheme adapted for WCDMA.

The demodulation techniques used in receivers of mobile stations can be frequency-shift keying (FSK), phase-shift keying (PSK) or others. In WCDMA it has been agreed that quadrature phase-shift keying (QPSK) demodulation schemes will be used. QPSK occurs by using two codes (code 1 and code 2) at the same rate (shown in FIG. 5) and provides a robust radio link connection with good spectral efficiency.

In UTRA different families of spreading codes are used to spread the signal. In FDD, Gold codes are used according to technical specification TS 25.213. In TDD, either scrambling codes of length 16 or codes with a period of 16 chips are used according to technical specification TS 25.223.

Referring back to FIG. 4, in a WCDMA system, after the received signal has been despread in the correlator 61 and filtered by the baseband filter 62, the final demodulation is processed in a rake receiver which is described in the following.

Radio systems suffer from multipath propagation in which signals arrive at a receiver from a number of paths of different lengths. This leads to a summation of randomly phased signals that may cause interference. In CDMA systems having high chip rate digital signals, it is possible to obtain a benefit of multipath propagation by using time diversity. This is done by using a rake receiver.

Figure 6:
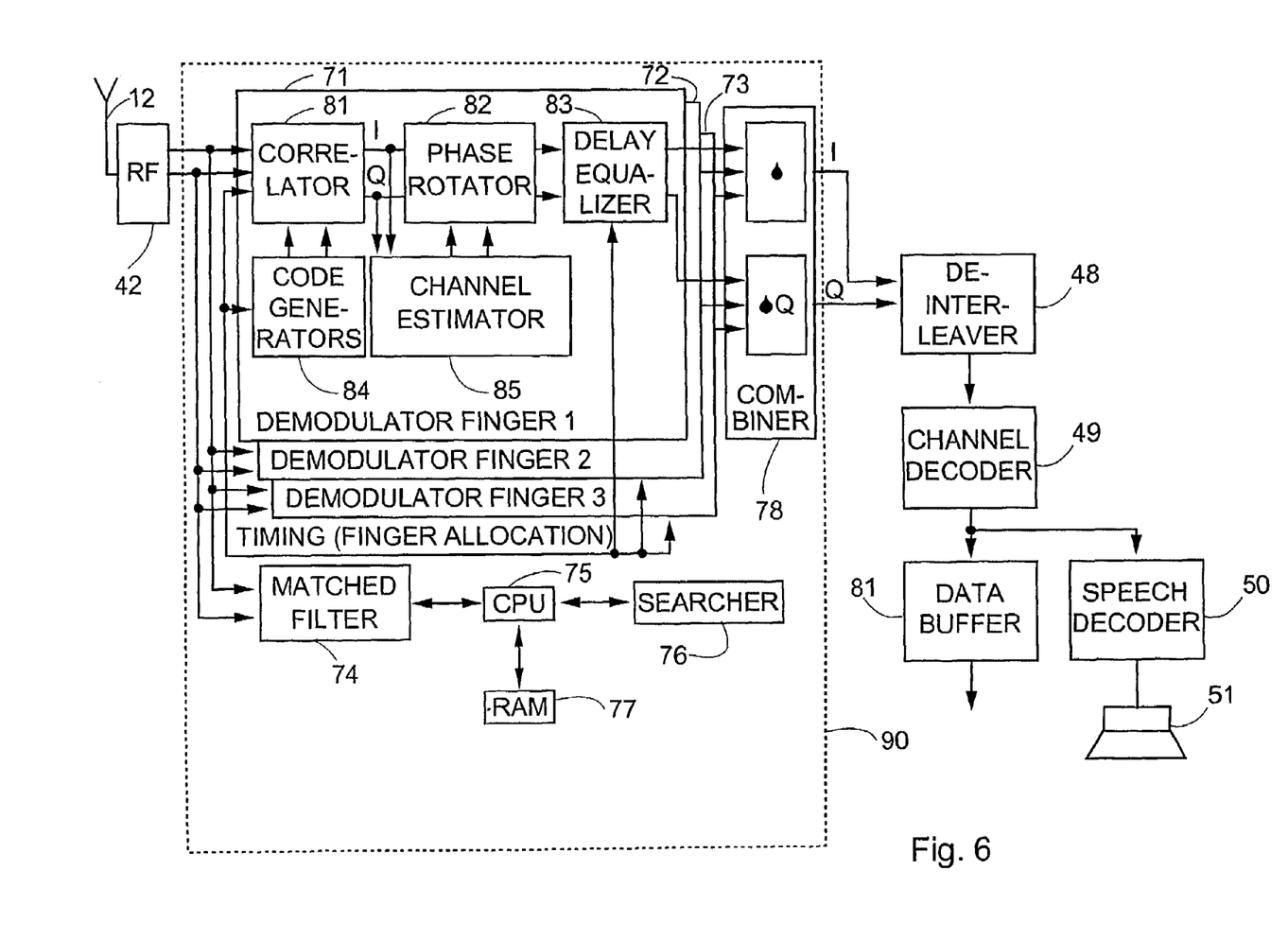
FIG. 6 shows a WCDMA mobile station comprising a rake receiver.

FIG. 6 shows a mobile station used in a WCDMA system. The mobile station comprises conventional features such as an RF block 42, a deinterleaver 48, a channel decoder 49, a data buffer 81, a speech decoder 50 and a speaker 51. These features are well known and they will not be described since they are not directly relevant to the following description. The mobile station also has a rake receiver 90 located between the RF block 42 and the deinterleaver 48. The rake receiver 90 comprises a number of correlator receivers, or demodulator fingers, which typically use the same code, whose operations are displaced relative to each other by increasing time intervals of the chip interval. The rake receiver 90 also comprises a matched filter 74 which is used for filtering the output of the RF block 42.

In UMTS, each signalling or traffic channel carries its own pilot signal (a channel associated pilot signal). Because the pilot signal is not continuous, a synchronisation marker is transmitted to enable the rake receiver 90 to find the pilot signal. When the point of synchronisation occurs, output of the correlator 61 is transformed from a wideband signal into a narrow band signal of the information bearing a carrier which passes through the narrow inter frequency IF band filter (in FIG. 6 matched filter 74). Once demodulated, a control signal is generated to set the receiver's clock at its nominal rate so as to track the incoming signal. A short code with high repetition rate is used to gain synchronisation.

With a channel associated pilot signal synchronisation arrangement, the power of the pilot is lower relative to noise than would be the case for a common pilot signal. By having periodic transmission of a very short known code sequence and having a fixed time alignment with the pilot signal gives necessary pre-alignment with the pilot sequence before despreading. The occurrence of a code having good auto-correlation properties will produce a short duration spike at the output of the matched filter 74. Those spikes act as markers for time alignment with each incoming signal. Different incoming signals producing a spike may be time dispersed paths from the serving cell or neighbouring cells. The synchronisation achieved must be maintained by running the receiver's clock at a rate exactly the same as the incoming signal rate. Delay clock tracking is used having two identical codes generated by a code generator 84 in the receiver one being one chip interval behind the other. The delayed and non-delayed signals are equalised in an equaliser 83. Output of the two correlators is summed in a combiner 78.

With the channelization processed by a channel estimator 85 and a phase rotator 82, data symbols on so-called I- and Q-branches are independently multiplied with an Orthogonal Variable Spreading Factor (OVSF) code. With the scrambling operation, the resultant signals on the I- and Q-branches are further multiplied by complex-valued scrambling code, where I and Q denote real and imaginary parts, respectively.

The rake receiver also comprises a searcher 76. The searcher 76 configures the demodulator fingers to monitor specific radio frequencies and downlink channels that can be configured to receive signals from different downlink radio bearers from BSSs of the WCDMA RAN. Parallel downlink demodulation enables the mobile station to receive signals from multipaths as explained above. The searcher 76 is in charge of initial synchronisation to be accomplished in downlink. The searcher 76 also controls all procedures the receiver does concerning the mobility management procedures known as cell re-selection and handover. Cell re-selection and handover refer to the mobile station being located and served by the most suitable base station of the RAN. According to channel measurements and possibly some other criteria the searcher 76 re-configures the demodulator fingers to listen to downlink of a new base station as specified in technical specifications TS 25.304 and TS 25.305.

SUMMARY OF THE INVENTION

According to a first aspect of the invention there is provided a method of operating a mobile station comprising the steps of:
providing the mobile station with a demodulator;
putting the mobile station into an idle mode;
measuring a currently assigned channel;
detecting whether the mobile station is stationary; and
reducing the activity of the demodulator if the mobile station is stationary.

Preferably the mobile station comprises a rake receiver. The rake receiver may comprise a plurality of demodulator fingers each of which is used to receive time diversified signals. Preferably the mobile station comprises a searcher. The searcher may be used for synchronising the time diversified signals.

Preferably the method comprises the step of measuring at least one non-assigned channel. The non-assigned channel may be measured by a demodulator finger of the rake receiver. This demodulator finger may be allocated for monitoring neighbouring, non-assigned, cells. It may be dedicated to this task. Alternatively, a currently non-assigned channel is measured by a demodulator finger which is also used for assigned channel reception. Measurement of the currently non-assigned channel or channels may occur during the idle mode for that demodulator finger.

Preferably reducing the activity occurs by deactivating the parts of the demodulator which are concerned with measuring the non-assigned channel. This may be at least one of the plurality of demodulator fingers. Alternatively it occurs by slowing down idle mode processing of the demodulator. That is, processing of idle mode frames carrying system information which are transmitted by base stations are processed by the mobile station less frequently. This may occur by processing only alternate frames or skipping more than every other frame.

Preferably reducing the activity of the demodulator involves disconnecting a voltage supply to one or more demodulator fingers. Alternatively it involves preventing signal state changes in the demodulator fingers. This may occur by disconnecting a timing signal to at least one of the demodulator fingers. This is particularly suitable if the demodulator fingers comprise CMOS circuitry.

Preferably the non-assigned channel being measured less frequently is the common control physical channel CCPCH. The non-assigned channel being measured less frequently may be the common primary pilot channel CPICH.

Detecting whether the mobile station is stationary may be done in several ways. In one embodiment, a motion detector is integrated in the mobile station. It may be done by detecting changes in power level or in other downlink measurement parameters in a received signal.

Preferably the step of determining whether the mobile station is stationary involves calculation of a motion indicator. The motion indicator may be calculated at specified time intervals. Preferably it is calculated based on one or more parameters selected from a group consisting of: RSSI of a serving cell, RSSI of a neighbouring cell, signal-to-interface ratio (SIR) of a serving cell, SIR of a neighbouring cell, received signal code power (RSCP) of a serving cell, RSCP of a neighbouring cell, block error rate (BLER) of a serving cell, BLER of a neighbouring cell, BER of a serving cell and BER of a neighbouring cell.

Preferably a combined motion indicator is calculated comprising a sum of measured parameters. Preferably it is a weighted sum of measured parameters. Preferably the motion indicator is compared with a threshold value to determine whether the mobile station is stationary. Preferably an average value of the combined motion indicator or a weighted average value of the combined motion indicator is compared with a threshold value. Motion is determined if the motion indicator exceeds the threshold value.

Preferably, if the average value of the combined motion indicator does not exceed the motion threshold value for at least a predetermined period of time the processing rate of searcher activity of the rake receiver is reduced. This step may be in addition to deactivating a demodulator finger.

According to a second aspect of the invention there is provided a mobile station comprising a receiver having a radio frequency block and a demodulator, means for putting the mobile station into an idle mode, means for measuring a currently assigned channel, a motion indicator for detecting if the mobile station is stationary and an activity controller for reducing the activity of the demodulator if the mobile station is stationary.

Preferably the mobile station comprises means for measuring at least one currently non-assigned channel.

According to a third aspect of the invention there is provided a telecommuncations system operating according to the first aspect of the invention or comprising a mobile station according to the second aspect of the invention.

In one embodiment, the mobile station is for use in a CDMA system. Preferably it is for use in a WCDMA system. The mobile station may be used in a third generation mobile system, for example the UTRA system. The receiver circuitry of the mobile station comprises a number of correlator receivers using the same code but displaced by increasing time intervals of the chip interval.

BRIEF DESCRIPTION OF THE DRAWINGS

Embodiments of the invention will now be described by way of example only with reference to the accompanying drawings in which.

DETAILED DESCRIPTION

Figure 2:
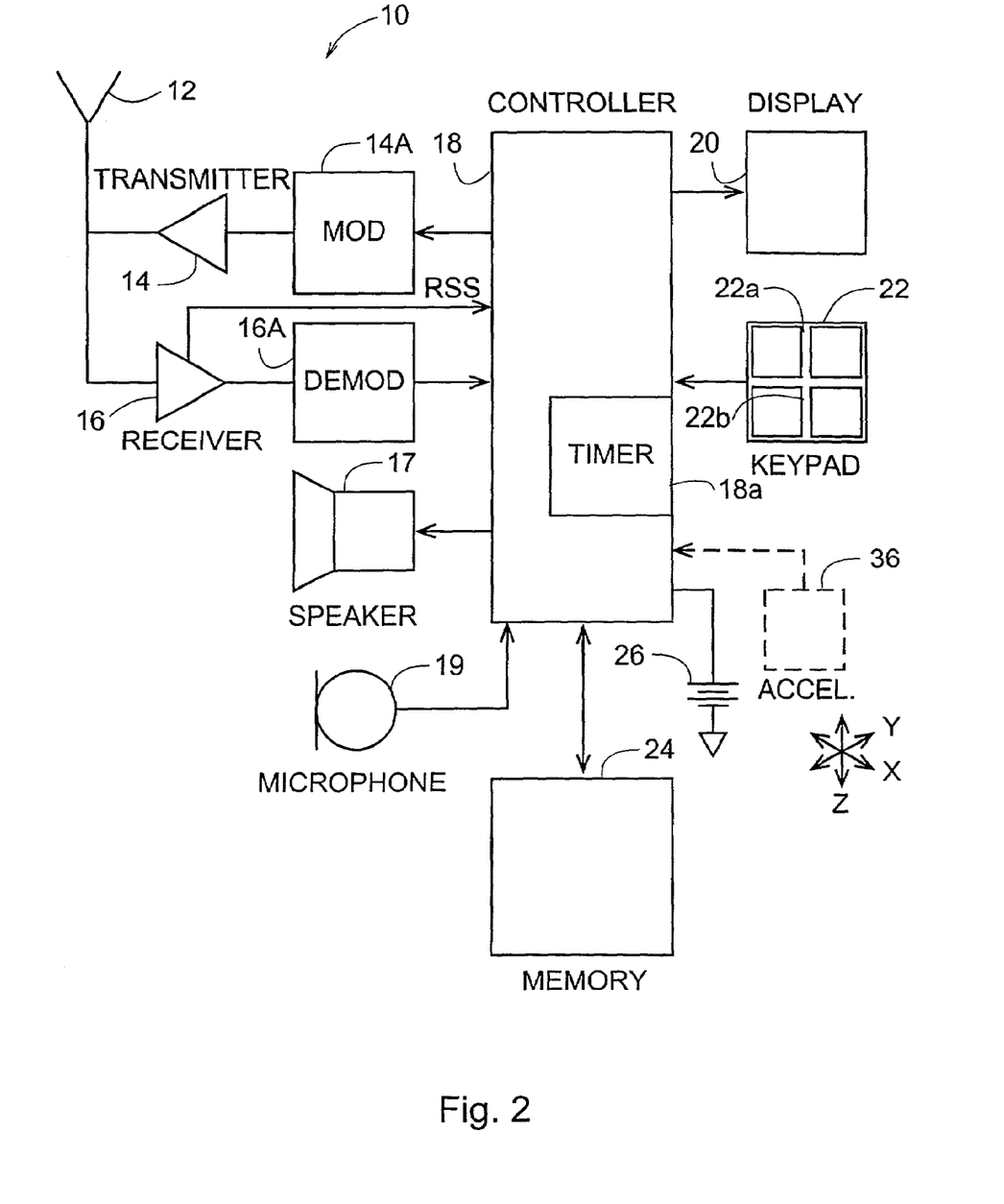
FIG. 2 shows a WCDMA mobile station.

FIG. 2 shows a WCDMA mobile station 10. The mobile station 10 comprises an antenna unit 12 for transmitting and receiving signals between itself and BSSs of a RAN of a universal terrestrial radio access network (UTRAN). The RAN of the UTRAN is connected to a core network (CN) of a universal mobile telecommunication system (UMTS) and comprises a mobile switching center (MSC) that provides connection from the RAN to other networks. Individual base stations of the RAN have radio coverage areas defining a cells which are typically adjacent, for example cell 1 and cell 2 in FIG. 1.

The mobile station 10 (user equipment) comprises a modulator MOD 14A, a transmitter 14, a receiver 16, a demodulator DEMOD 16 A and a controller 18 which provides signals to and receives signals from the transmitter 14 and the receiver 16 respectively. These signals include signalling information in accordance with air interface specifications of applicable cellular systems specifications and user payload such as speech and data. The air interface specification of the UTRAN is specified in technical specification TS 25.304. The UTRAN has FDD and TDD mode air interface connections which are measured at least for channel re-selection purposes. The measured channels are a common control physical channel CCPCH in TDD mode and a common primary pilot channel CPICH in FDD mode. A plurality of cells provides good coverage over a wide area. As the mobile station moves, strength and quality of the received signal varies. In its idle mode the mobile station 10 measures the received signal strength indicator (RSSI) of the currently used BSS as well as the best neighbouring cells. The mobile station also measures bit error ratio (BER), block error rate (BLER), signal to interference ratio (SIR) and received signal code power (RSCP).

The mobile station comprises an earphone or a speaker 17, a microphone 19, a display 20, and a user input device, typically a keypad 22, all of which are coupled to the controller 18. The keypad 22 includes conventional numerical (0 to 9) and additional related keys 22a, for example a SEND key and an END key, used for operating the mobile station 10. The mobile station 10 also includes several memories, shown as single memory block 24, in which constants and variables used for control operation are stored. An operating program is stored in the memory block 24. It may contain other matters such as user messages. A battery 26 powers the mobile station 10. The mobile station 10 also comprises means to determine whether it is stationary.

Figure 3:
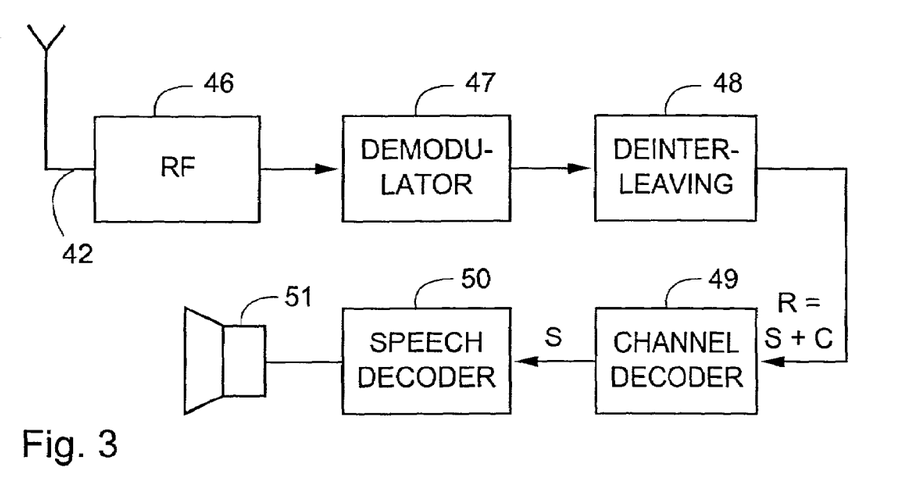
FIG. 3 shows a downlink path of a WCDMA mobile station.

FIG. 3 shows the major blocks in the downlink, receiver, path of the WCDMA mobile station. A signal is received by an antenna unit 42 and passed on to a power amplifier, filtering and scrambling section 46. The signal is then demodulated in a demodulator 47. The demodulated signal is passed to a deinterleaving block 48 which re-orders all the bits that were distributed and ordered according to the modulation scheme of the radio link of the system. Ordering is originally carried out in order to provide a more error burst tolerant transmission. A channel decoder 49 carries out correction. In the case of speech, the signal is decompressed in a speech decoder unit 50 according to applied speech coding methods, and the resultant digitised speech is used to drive an audio speaker unit 51.

Operation of the WCDMA mobile station will now be described. When it is switched on, the mobile station carries out a cell search as soon as all the receiver circuitry has settled into a power on state and all its necessary basic configuration settings have been carried out so that it is functioning normally. During the cell search (controlled by the searcher 76) the mobile station detects a downlink transmission of a cell, and then the scrambling code and frame synchronisation of the cell is handled.

The primary scrambling code is identified, the primary common control physical channel (PCCPCH) is detected, and super-frame synchronisation can then be acquired so that the system and cell specific broadcast channel (BCH) information can be read. The BCH carries all cell specific information of the physical link layer itself like timing offset information of the secondary common control physical channel (SCCPCH) against the PCCPCH as well as other information like service support of the cell to the mobile stations capable of listening to it. If the mobile station has received a priority list with information about which scrambling codes to search for, the cell search procedure done by the searcher 76 (described above in relation to FIG. 6) may be simplified.

Measurement of a neighbouring cell is done according to a priority list received from the base station. Each base station may have been configured to support a priority list according to a defined radio network coverage plan. In a fully synchronised network or a pre-synchronised network (that is a partly synchronised radio network in which neighbouring cells are synchronised with each other), the base station transmits the priority list as part of the BCH data to the mobile stations in order to support an optimised or a simplified cell search procedure as described above.

Figure 9:
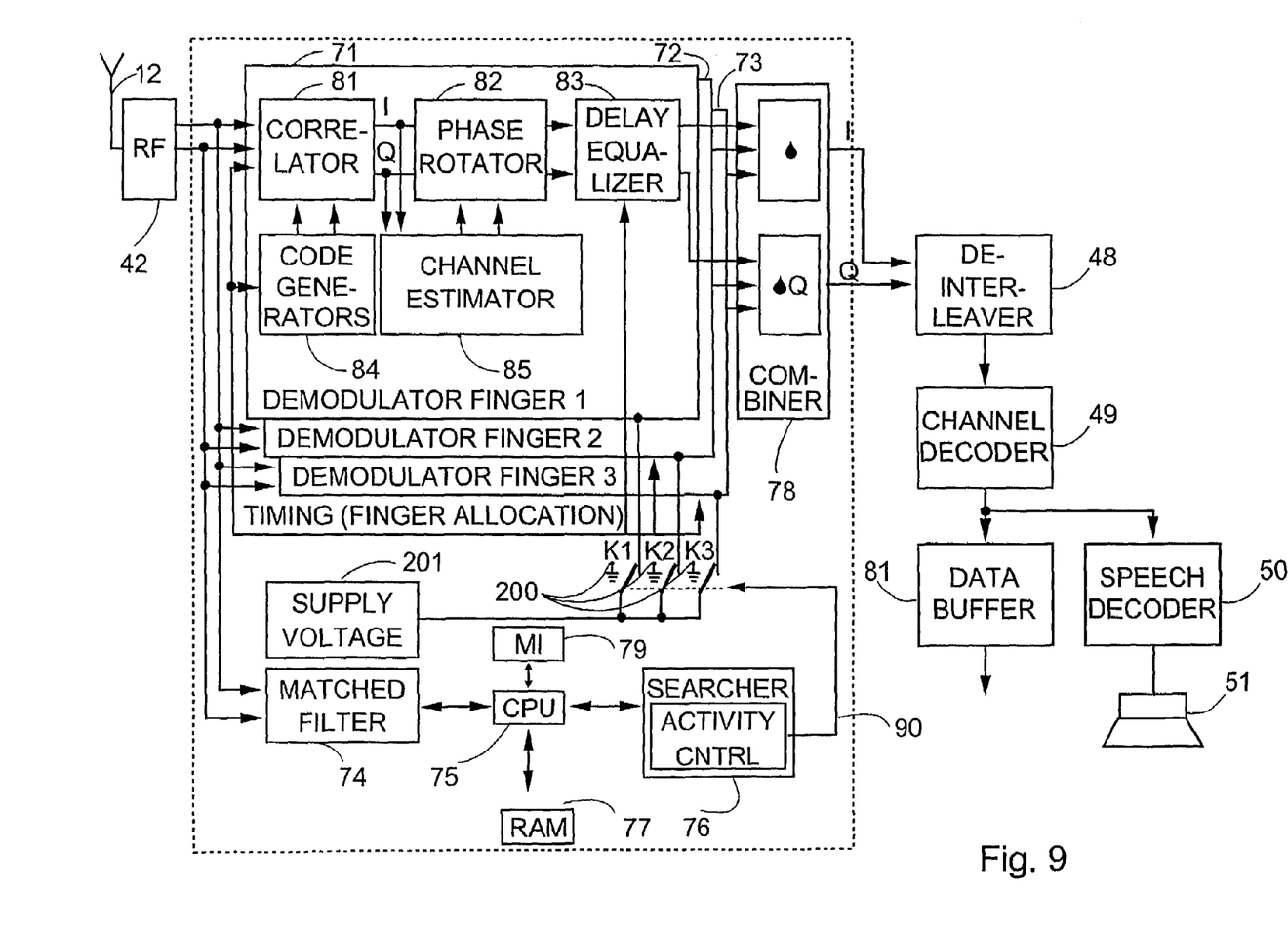
FIG. 9 shows a WCDMA mobile station comprising a rake receiver according to one aspect of the invention.

FIG. 3 is presented in another form in FIG. 9. As can be seen from FIG. 9, the demodulator 47 is shown in greater detail as numeral 90. FIG. 9 has many features in common with FIG. 6 and like reference numerals have been applied to like parts for those parts of FIG. 6 and FIG. 9 which operate in a similar way. Another description of the operation will not be given. However, additional features and their operation will now be described. In FIG. 9, the rake receiver comprises a motion indicator (MI) 79 connected to the CPU 75. The MI 79 identifies a stationary state of the mobile station. This calculates a time dependent motion indicator value as a function of received signal length indicator RSSI, signal to interference ratio SIR, received signal code power RSCP, block error rate BLER and bit error rate BER each measured value having coefficient different or equal to zero. This can be in addition to the acceleration transducer 36 or may be present instead of it.

Figure 7:
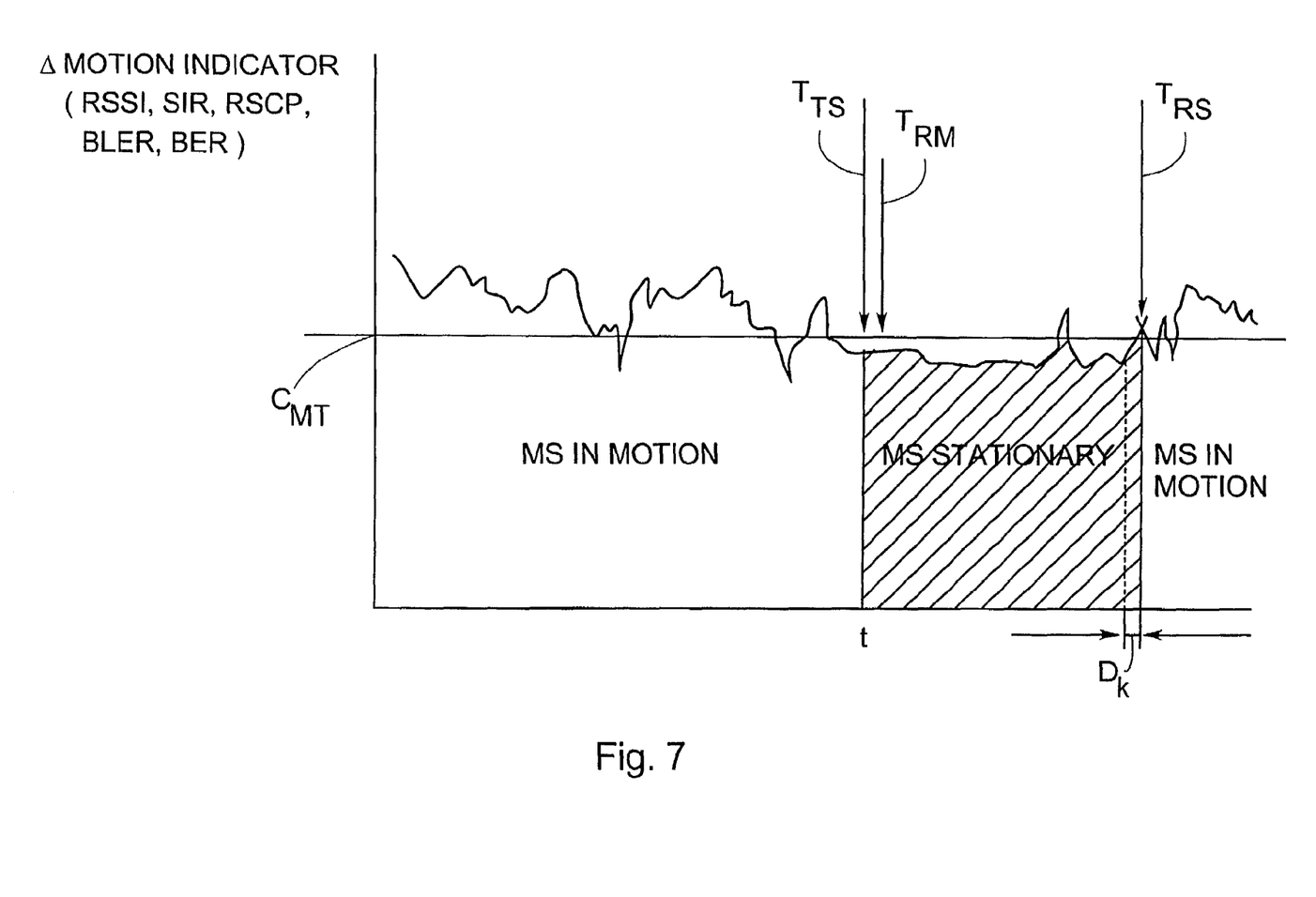
FIG. 7 shows variation of a motion indicator with respect to time.

A motion indicator value M(n,k) is calculated by the MI 79 to give an indication of motion which has occurred between a current measurement n and a previous measurement indicated by a integer k. There are a number of previous measurements k. The larger the value of k, the earlier the measurement. The difference between the time when measurement k having its maximum value of $k_{limit}$ ($k_{limit}$ is a configurable constant) was measured and when measurement n was measured is shown in FIG. 7 by a period $D_k$. Period $D_k$ is a measurement margin that is chosen to be suitable to determine whether the mobile station is stationary or in motion depending on MT change with respect to time.

The motion indicator value is calculated as follows:

$$M(n, k) = \sum_{j=1}^{5} \left\{ A_1(j) \left| f_j(R_j(n)) - f_j(R_j(n-k)) \right| + A_2(j) \sum_{i=1}^{5} |f_j(S_j(i, n)) - f_j(S_j(n-k))| \right\}$$

where
- $R_1(n)$ is the received signal strength indicator (RSSI) of the serving cell;
- $R_2(n)$ is the signal to interference ratio (SIR) of the serving cell;
- $R_3(n)$ is the received signal code power (RSCP) of the serving cell;
- $R_4(n)$ is the block error rate (BLER) of the serving cell;
- $R_5(n)$ is the bit error rate (BER) of the serving cell;
- $R_j(n-k)$ refers to measurements of these parameters made at an earlier time (where k equals one, this refers to the most recent measurement);
- $S_1(i,n)$ is the received signal strength indicator (RSSI) of adjacent cell i;
- $S_2(i,n)$ is the signal to interference ratio (SIR) of adjacent cell i;
- $S_3(i,n)$ is the received signal code power (RSCP) of adjacent cell i;
- $S_4(i,n)$ is the block error rate (BLER) of adjacent cell i;
- $S_5(i,n)$ is the bit error rate (BER) of adjacent cell i;
- $S_j(n-k)$ refers to measurements of these parameters made at an earlier time (where k equals one, this refers to the most recent measurement);
- $f_j$ is a mapping function, which alters the sensitivity of the motion indicator to changes in the measured quantities at different absolute levels of the quantities; and
- $A_1(j)$ and $A_2(j)$ are constants chosen to give an appropriate sensitivity of the motion indicator. These are determined to optimise the performance of the method, but initially they can be defined as identity functions and unity constants. For all values of (j) and for (delay less than 0) standing the initial values for motion indicator calculations when the measurement margin period $D_k$ has not elapsed and measurement parameters and resulting motion indicator values in respect of time cannot be determined from the present measurement time n back to the measurement time $(n-k_{limit})$. The initial calculation results during the first measurement margin period can, for example, have values:

$R_j(d)=R_j(0)$, and $S_j(d)=S_j(0)$.

such as for when the mobile station has been switched on and not many idle mode frames have occurred (that is not enough previous k measurements). In this case, there are not many measurements available for neighbouring cell measurements made in respect of the serving cell. When the mobile station has been powered on a while and it has been determined that it is stationary some reduction of receiver demodulator operation may be put into effect meaning that, for instance, coefficient $A_2(j)$ of motion indicator value formula M(n,i) may be set to zero.

The combined motion indicator value is:

$$C(n) = \sum_{i=1}^{m} B_i M(n, i)$$

where $B_I$ is a configurable constant; and parameter (m) is an upper limit value of the variable (i) in the combined motion indicator formula and is also a configurable constant.

In another embodiment detecting motion of the mobile station may be determined by a motion sensor unit such as an acceleration transducer 36 having three sensitive axes one for each orthogonal direction in space.

The combined motion indicator value C(n) is compared by the MI 79 against a pre-set motion threshold value $C_{MT}$. Alternatively, it may be compared by the CPU 75 or the searcher 76. It may be compared by two or more of these blocks acting together. $C_{MT}$ is a configurable constant. If the motion indicator value C(n) is below the motion threshold value $C_{MT}$ the activity of the searcher 76 is reduced. For example, more demodulator fingers 71, 72 and 73 may be allocated for a moving mobile station than for a stationary one. FIG. 7 shows deactivation of a demodulator finger at $T_{TS}$ and reactivation at $T_{RS}$. The rate at which the searcher 76 measures the assigned (dedicated) channel may be reduced to a minimum (such as not measuring so frequently in idle mode frames). This occurs at time $T_{RM}$, which, at its earliest, may be equal to $T_{TS}$. This reduced activity lasts, at the latest, until the moment when the demodulator finger is re-activated (that is at time $T_{RS}$). Ending of the reduced activity can occur as a result of the measured margin of C(n) delta value (that is the minimum measurement margin between n and $n-k_{limit}$) having a bigger value than the motion threshold value $C_{MT}$.

In an alternative embodiment of the invention, the power saving step involves the rake receiver 90 doing certain functional procedures less frequently. A further power saving step such as deactivating a modulator finger may not be carried out. This may apply in an embodiment in which there is only one demodulator which monitors the assigned and non-assigned channels. It may do this by monitoring the non-assigned channel during the idle mode frames. While the mobile station is stationary it finds the pilot radio frequency of the important downlink transmission signals of each nearby base station such as active downlink, the candidate downlink used in cell re-selection and handover situations as new downlink resulting to be best available serving cell. The new serving cell is selected according to neighbour cell measurement signal procedure described in technical specification TS 25.304.

Cell selection procedure in which the best possibly serving cell is carrried out by the rake receiver 90 (FIGS. 9 and 10) after the mobile station has been powered on. This procedure will now be described.

As mentioned above, while the mobile station is stationary, conditions of the radio connection between itself and the base station are not affected by any movement of the mobile station and certain procedures of the searcher 76 do not need to be carried out as frequently. However, although the mobile station is stationary, conditions of the radio connection may change due to changes in the surrounding reception environment of the mobile station, for example, movement of vehicular traffic or a malfunction in the BSS transceiver that may result in a need for cell re-selection. It is thus important to keep on measuring the serving cell at a certain rate and when measured parameters such as RSSI, SIR, RSCP, BLER and BER are found to be unsatisfactory (despite the mobile station being stationary) cell re-selection may be carried out. Then the searcher 76 will process a conventional cell re-selection procedure as specified in technical specification TS 25.304.

Figure 8A:
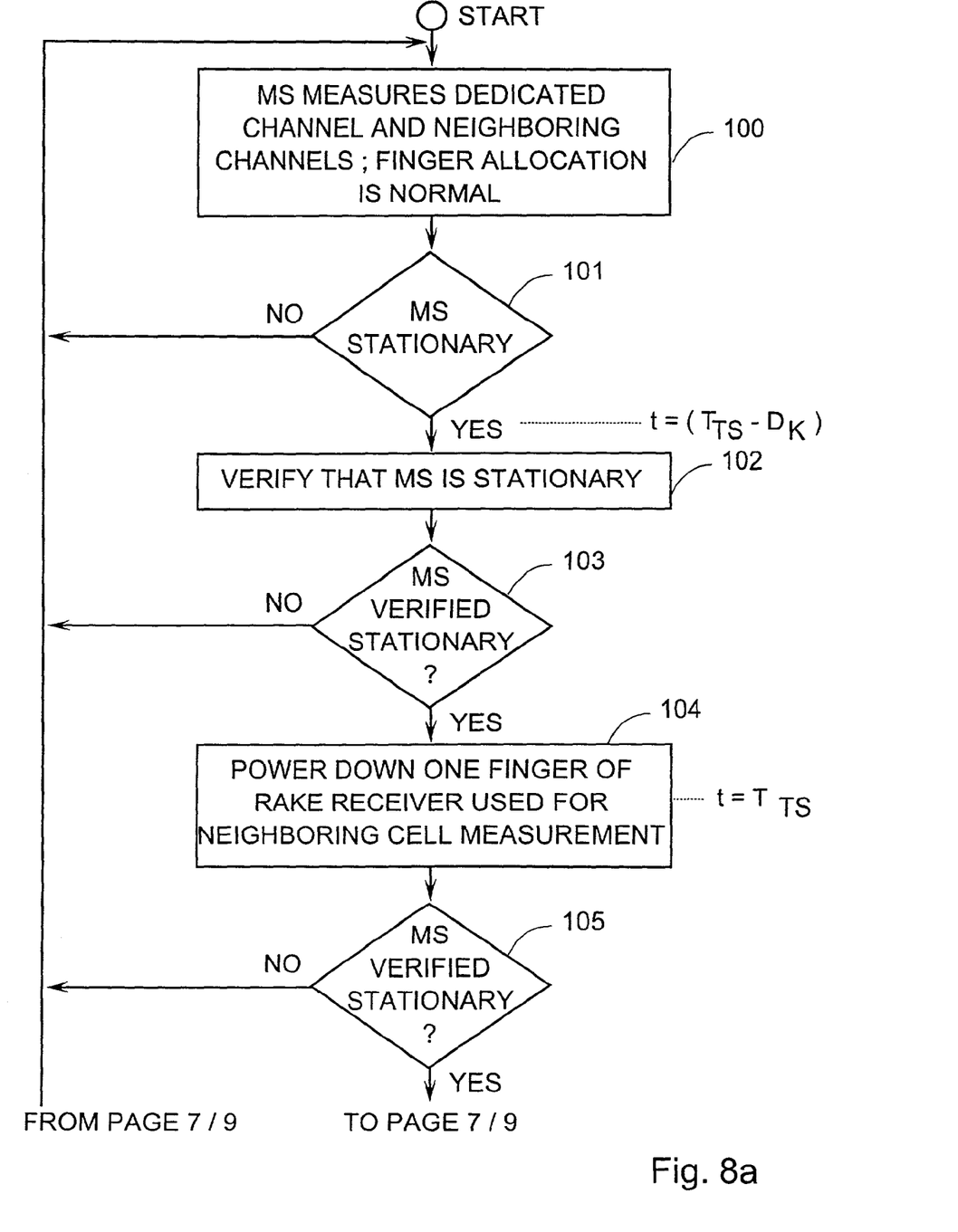
FIG. 8 shows logical steps for operating a rake receiver.
Figure 8B:
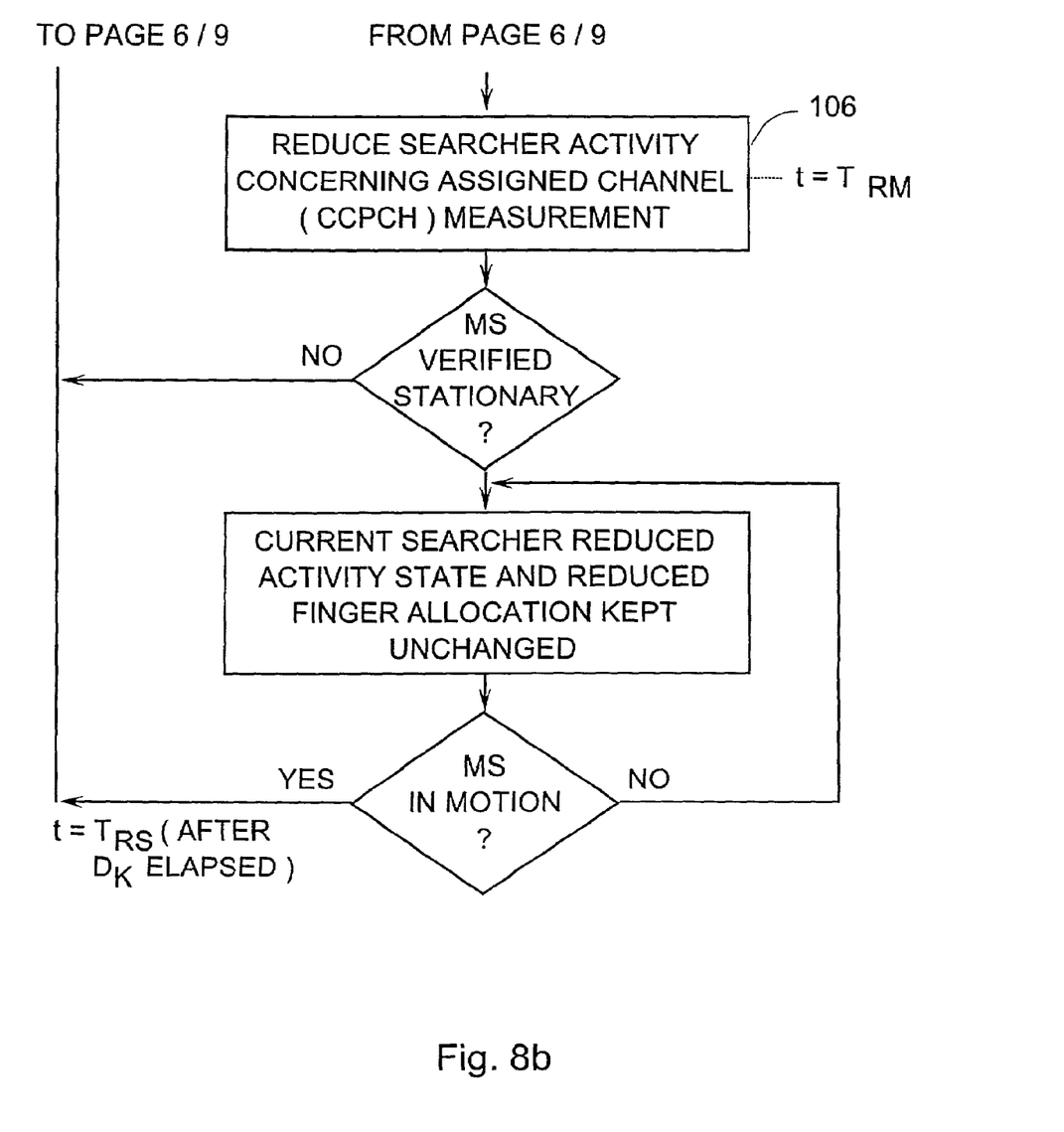

Operation of a rake receiver of a WCDMA mobile station during a stationary period is shown in a series of logical steps in FIG. 8. In an initial step 100, the mobile station is measuring a dedicated channel and neighbouring channels. All of the demodulator fingers are allocated. In step 101, it is determined that the mobile station is stationary at a time of $T_{TS}$–$D_k$. This is determined by checking if the average or weighted average value of the motion indicator value C(n) is less than or equal to the motion threshold value $C_{MT}$.

If the motion indicator value C(n) stays less than or equal to the motion threshold value $C_{MT}$ until a certain time period ($T_{TS}$) has elapsed the mobile station stops measuring neighbouring cells and deactivates the related demodulator finger (step 104). If it is confirmed that the average or weighted average value of the motion indicator value C(n) remains less than or equal to the motion threshold value $C_{MT}$ until a certain time period ($T_{RM}$) has elapsed, the mobile station reduces the rate at which the searcher 76 makes assigned channel measurements (step 106). If the average or weighted average motion indicator value C(n) remains less than or equal to the motion threshold value $C_{MT}$, the reduced finger allocation of the rake receiver 90 demodulator section and reduced searcher 76 activity is maintained at minimum levels until it is observed that the motion indicator value C(n) is exceeding the motion indicator threshold value $C_{MT}$. This is recognised to occur when the average or weighted average value of C(n) exceeds the motion threshold value $C_{MT}$ and remains greater until the expiration of a delay time $D_k$ (the motion indicator measurement summation margin from n to n–$k_{limit}$ expressed in time). As a consequence of the threshold being exceeded for the delay time $D_k$, the searcher 76 activity is restored to normal activity to process neighbouring cell and assigned channel measurements as frequently as possible as specified in TS 25.304. Then at least one rake receiver finger can be re-allocated to do neighbouring cell measurements in such a way that firstly the circuitry of the demodulator finger section is switched on and secondly the searcher 76 configures its functioning conditions to support neighbouring cell measurement scheme according to 3GPP UMTS specifications.

In FIG. 8, the measured channel is the common control physical channel (CCPCH) (step 106). This represents stationary state determination of a WCDMA receiver occurring in TDD mode. If stationary determination of a WCDMA receiver occurs in FDD mode the measured channel in step 106 is the common primary pilot channel (CPICH).

Alternatively, the reduced measurement frequency of the dedicated channel may start at a time $T_{RM}$ which is prior to the deactivation time ($T_{TS}$) of a demodulator finger of the rake receiver 90. In this case, the reduction of activity of the searcher 76 may occur first for neighbouring cell measurements making the measurement rate slow down. The assigned channel measurement rate may also slow down at the same moment. In relation to FIG. 8 this would mean swapping the positions of the steps 104 and 106. In this case, in addition to the reduction in activity of the searcher carrying out measurement of the assigned channel this step (step 106) may also include reduction in searched activity processed for neighbouring cell measurement.

The logic applied for motion indicator determination can be written as a computer program as follows:

```
n = 0;
Stationary_timer = 0;
Set the use of the searcher to SEARCHER_USAGE(0);
Set the finger allocation to "normal";
LOOP FOREVER
   Wait for and receive a system information and simultaneously make
   the measurements;
   Calculate C(n);
   IF C(n) > MOTION_THRESHOLD THEN
      Set the use of the searcher to SEARCHER_USAGE(0);
      Set the finger allocation to "normal";
      Stationary timer = 0;
   ELSE
      Stationary_time = Stationary_timer + 1;
   ENDIF
   FOR k = 1 TO N_OF_STEPS DO
      IF stationary_time = MOTION_TIMEOUT (k) THEN
         Reduce the use of searcher to SEARCHER_USAGE(k);
      ENDIF
      IF stationary_time = MOTION_TIMEOUT(k) THEN
         Reduce the finger allocation to "minimized";
      ENDIF
   ENDFOR
   n = n + 1;
ENDLOOP
```

In FIG. 9 the searcher 76 configures the finger allocation by using the matched filter 74 controlling the correlator functionality of each finger of the rake receiver 90. The searcher 76 also controls power supplied to the demodulator finger circuitry by operating a switch arrangement k1, k2 or k3 in such a way that individual demodulator fingers can be deactivated by being connected to ground 200 instead of to a supply voltage source 201. In this way supply voltage consumption is reduced. Any suitable means can be adopted so that individual demodulator fingers may be deactivated.

Figure 10:
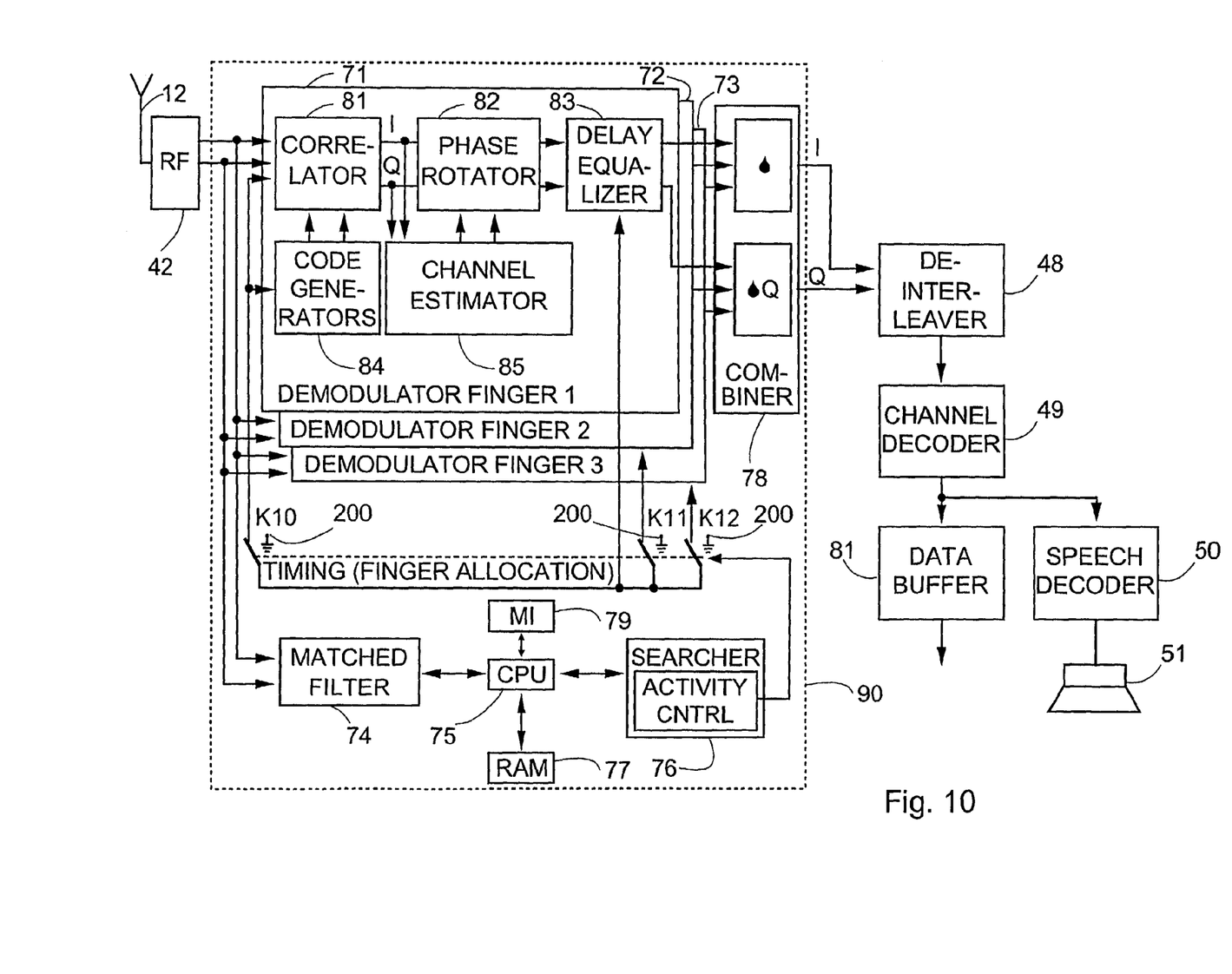
FIG. 10 shows a WCDMA mobile station comprising a rake receiver according to another aspect of the invention.

FIG. 10 shows another embodiment of the invention in which Complementary metal oxide semiconductor (CMOS) circuitry is used for rake receiver demodulator fingers. CMOS circuitry has very low static power dissipation. This enables devices in an inverter or logic gate always to be off when no voltage state changes occurs. The only residual current drawn is from leakage current, typically ~1 µA. When the rake receiver 90 demodulator finger circuitry is switched off the power consumption reduction in CMOS circuits close to zero is achieved by preventing voltage state change occurrences. When the searcher 76 makes power switching off from at least one finger of the rake receiver demodulator section the searcher 76 controls the finger circuitry so as to prevent any Rx signal from entering the timing pulse train at the input of the demodulator finger. The clock pulse disconnection to the demodulator finger of the rake receiver 90 demodulator is done, for example, by having control switches k10, k11 and k12 to disconnect the clock pulse connection from being passed to the receiver circuitry 90 demodulator fingers and instead to be connected, for example, to ground 200.

WCDMA is used as an example of a system where a method according to the invention can be implemented. The method and apparatus according to the invention are not restricted to those used in third generation cellular receivers. They can be applied also to other types of mobile stations and radio networks.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method of operating a mobile station, comprising the steps of:
   providing the mobile station with a demodulator comprising a plurality of demodulator fingers;
   putting the mobile station into an idle mode;
   measuring a non-assigned channel from a neighboring cell using one of said plurality of demodulator fingers during said idle mode;
   measuring a currently assigned channel using one of said plurality of demodulator fingers;
   detecting whether the mobile station is stationary; and
   reducing the activity of the demodulator if the mobile station is stationary,
   wherein the step of reducing the activity of the demodulator is carried out by deactivating said one of said plurality of demodulator fingers used to measure said non-assigned channel without deactivating the entire mobile station.

2. A method according to claim 1, wherein each of the fingers is used to receive time diversified signals.

3. A method according to claim 2, wherein the demodulator fingers comprise CMOS circuitry.

4. A method according to claim 1, wherein the mobile station comprises a rake receiver.

5. A method according to claim 1, wherein the step of reducing the activity comprises slowing down idle mode processing in the demodulator.

6. A method according to claim 1, wherein the step of reducing the activity of the demodulator is carried out by disconnecting a voltage supply to said one of the plurality of demodulator fingers.

7. A method according to claim 1, wherein the step of reducing the activity of the demodulator is carried out by preventing signal state changes in the demodulator fingers.

8. A method according to claim 7, wherein said preventing step comprises the step of disconnecting a timing signal to at least one of the demodulator fingers.

9. A method according to claim 1, wherein the assigned channel is the common control physical channel CCPCH.

10. A method according to claim 1, wherein the assigned channel is the common primary pilot channel CPICH.

11. A method according to claim 1, wherein the non-assigned channel is the common control physical channel CCPCH.

12. A method according to claim 1, wherein the non-assigned channel is the common primary pilot channel CPICH.

13. A method according to claim 1, wherein a motion indicator is calculated to determine whether the mobile station is stationary.

14. A method according to claim 13, wherein the motion indicator is calculated in a motion detector present in the mobile station.

15. A method according to claim 13, wherein the motion indicator is used to detect changes in power level or in other downlink measurement parameters in a received signal.

16. A method according to claim 13, comprising the step of calculating the motion indicator based at least one parameter selected from a group consisting of: received signal strength indicator RSSI of a serving cell, received signal strength indicator RSSI of a neighbouring cell, signal to interface ratio SIR of a serving cell, signal to interface ratio SR of a neighbouring cell, received signal code power RSCP of a serving cell, received signal code power RSCP of a neighbouring cell, block error rate BLER of a serving cell, block error rate BLER of a neighbouring cell, bit error rate BER of a serving cell and bit error rate BER of a neighbouring cell.

17. A method according to claim 1, comprising the step of reducing the processing rate of searcher activity if a motion indicator does not exceed a threshold value for at least certain predetermined period of time.

18. A telecommunications system comprising a mobile station, said mobile station comprising a receiver having a radio frequency block and a demodulator including a plurality of demodulator fingers, means for putting the mobile station into an idle mode, means for measuring a non-assigned channel from a neighboring cell using one of said plurality of said demodulator fingers during said idle mode, means for measuring a currently assigned channel using one of said plurality of demodulator fingers, a motion indicator for detecting if the mobile station is stationary and an activity controller for reducing the activity of the demodulator if the mobile station is stationary by deactivating said one of said plurality of demodulator fingers used to measure said non-assigned channel without deactivating the entire mobile station.

19. A telecommunications system according to claim 18 comprising a WCDMA system.

20. A mobile station comprising a receiver having a radio frequency block and a demodulator including a plurality of demodulator fingers, means for putting the mobile station into an idle mode, means for measuring a non-assigned channel from a neighboring cell using one of said plurality of demodulator fingers during said idle mode, means for measuring a currently assigned channel using one of said plurality of demodulator fingers, a motion indicator for detecting if the mobile station is stationary and an activity controller for reducing the activity of the demodulator if the mobile station is stationary by deactivating said one of said plurality of demodulator fingers used to measure said non-assigned channel without deactivating the entire mobile station.

21. A telecommunications system comprising a mobile station according to claim 20.

22. A telecommunications system according to claim 21 comprising a WCDMA system.

* * * * *